No. 872,989. PATENTED DEC. 3, 1907.
P. C. CLARKE.
LIQUID MEASURING TANK.
APPLICATION FILED JAN. 25, 1907.
2 SHEETS—SHEET 1.
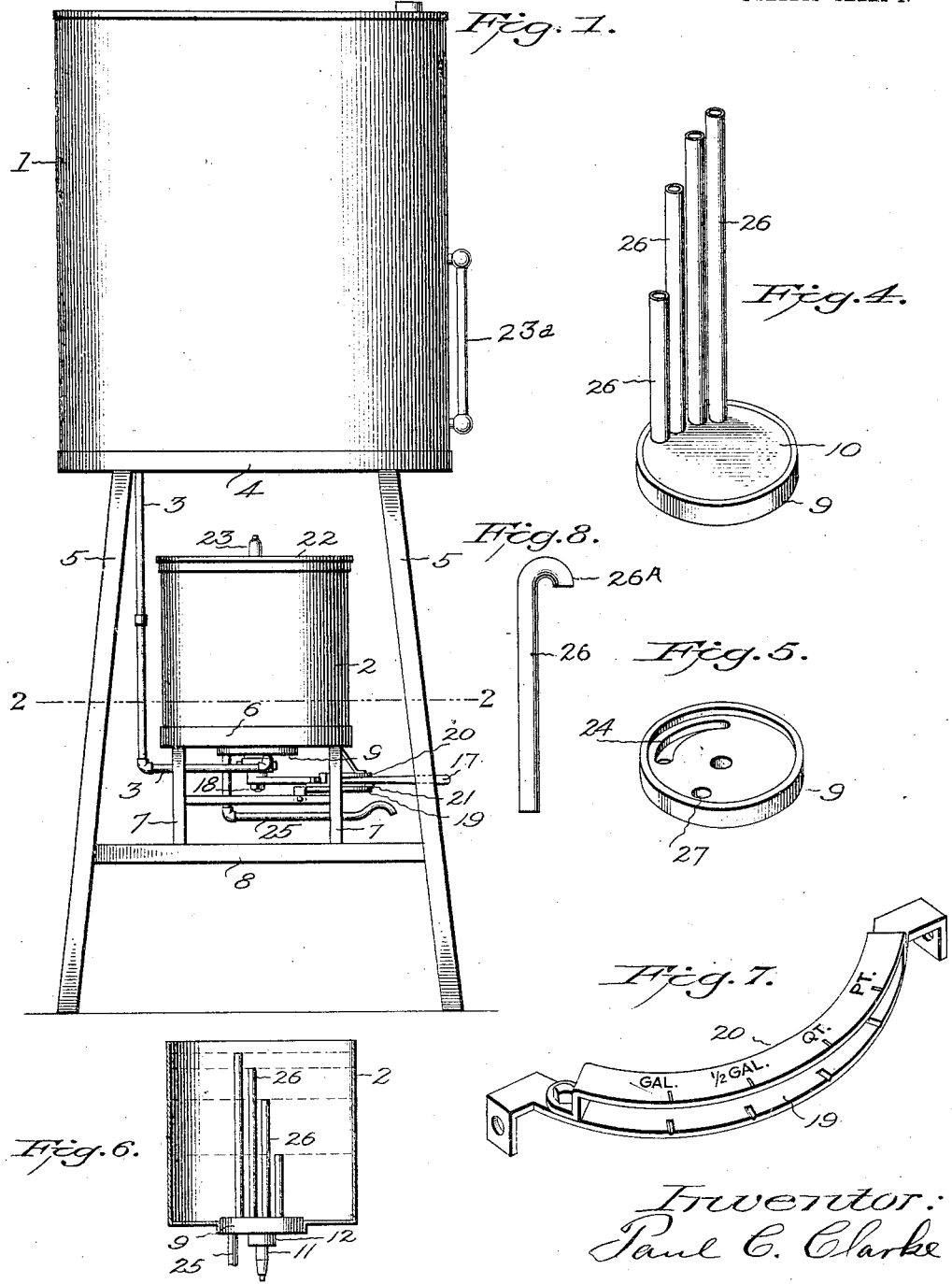
Witnesses:
G. Sargent Elliott,
Adella M. Towle
Inventor:
Paul C. Clarke
By
H. S. Bailey, Attorney.

No. 872,989. PATENTED DEC. 3, 1907.
P. C. CLARKE.
LIQUID MEASURING TANK.
APPLICATION FILED JAN. 25, 1907.
2 SHEETS—SHEET 2
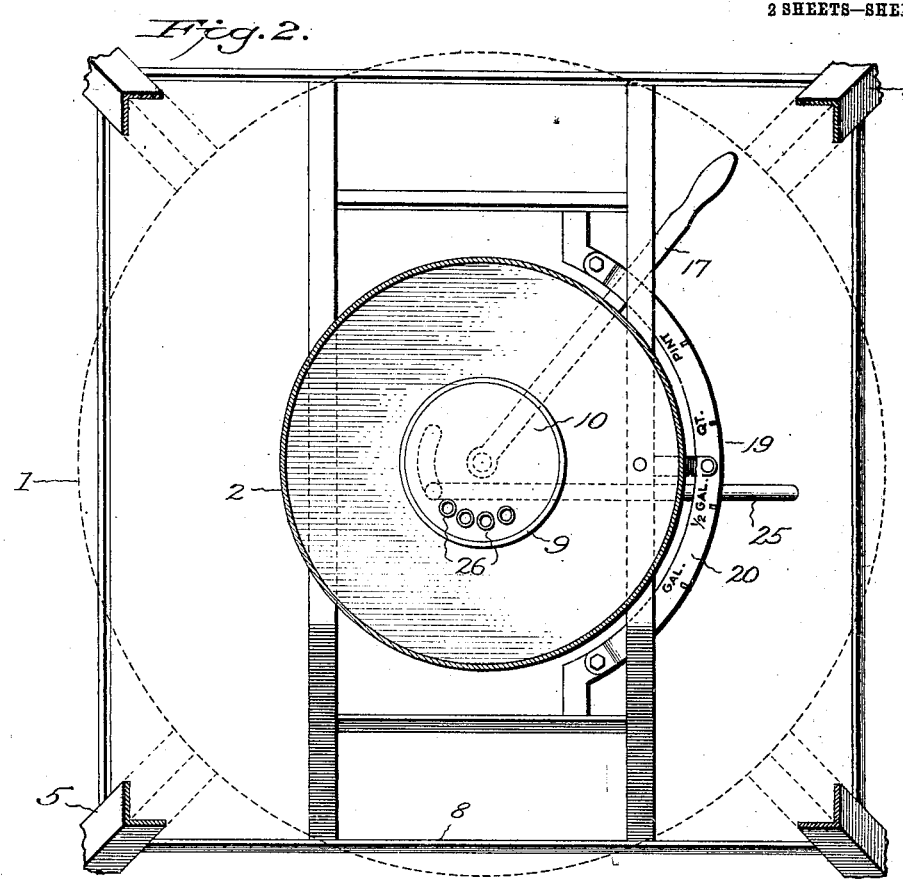
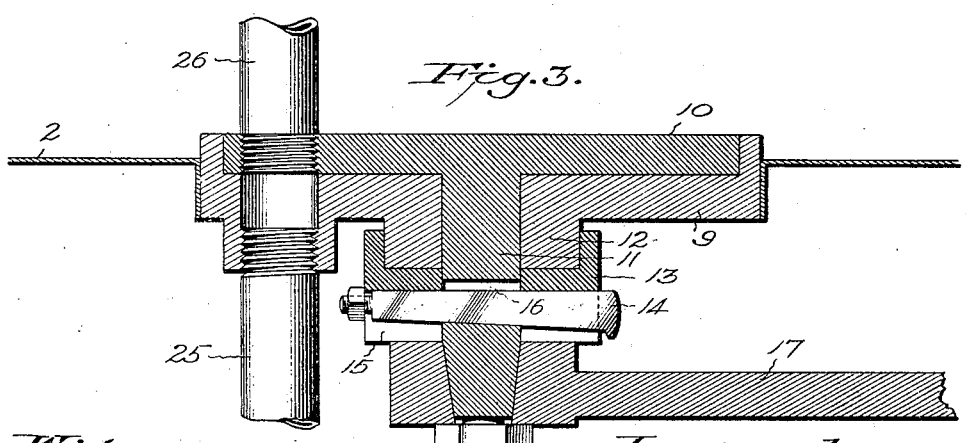
Witnesses:
G. Sargent Elliott
Adella M. Fowle
Inventor:
Paul C. Clarke
By H. S. Bailey, Attorney.

UNITED STATES PATENT OFFICE.

PAUL C. CLARKE, OF DENVER, COLORADO, ASSIGNOR OF ONE-THIRD TO GEORGE BIGNELL AND ONE-THIRD TO EZRA O. COCHRAN, BOTH OF DENVER, COLORADO.

LIQUID-MEASURING TANK.

No. 872,989.     Specification of Letters Patent.     Patented Dec. 3, 1907.

Application filed January 25, 1907. Serial No. 354,024.

*To all whom it may concern:*

Be it known that I, PAUL C. CLARKE, a citizen of the United States of America, residing at the city and county of Denver and State of Colorado, have invented a new and useful Liquid-Measuring Tank, of which the following is a specification.

My invention relates to improvements in liquid measuring tanks, and the objects of the invention are: First, to provide an automatic liquid measuring tank of different predetermined capacities, such as pints, quarts, half-gallons, gallons, or other quantities. Second, to provide a liquid measuring tank that will automatically measure pints quarts, half-gallons, gallons, and other predetermined quantities of such liquids as vinegar, milk, cream, gasolene, kerosene, and other liquids of domestic use. And third, to provide a simple, easily operated, inexpensive, and reliable liquid measuring tank, that is adapted to automatically and quickly measure out the commonly sold amounts of the various liquids of domestic consumption and use, that are sold in small measured quantities in grocery stores.

I attain these objects by the mechanism illustrated in the accompanying drawings, in which:

Figure 1, is a side elevation of my improved liquid measuring tank. Fig. 2, is a horizontal, sectional view on line 2—2 of Fig. 1. Fig. 3, is a vertical, section view (full size) of the valve mechanism and operating means, showing a portion of one of the measuring tubes, registering with the outlet or discharge pipe. Fig. 4, is a perspective view of the valve seat and disk, with the measuring tubes. Fig. 5, is a perspective view of the valve disk seat. Fig. 6, is a vertical, sectional view through the measuring tank, showing, approximately, the relative lengths of the measuring tubes, when arranged to measure pints, quarts, half-gallons, and gallons. Fig. 7, is a perspective view of the graduated quadrant bracket, through which the operating handle passes, and, Fig. 8, is a view of a modified form of measuring tube.

Similar letters of reference refer to similar parts throughout the several views.

Referring to the drawings, the numeral 1, designates a liquid holding reservoir, and 2 designates my liquid measuring tank, which is connected to the bottom of the reservoir by a supply pipe 3. The liquid measuring tank is supported underneath the reservoir; I preferably place the reservoir upon a support, comprising a platform 4, mounted upon legs or standards 5, which also support a platform 6, mounted on legs 7, which are secured to braces 8, which connect the legs or standards of the main supporting frame, as clearly shown in Fig. 1. The reservoir comprises a large liquid holding vessel of any suitable shape, to the bottom of which one end of the supply pipe 3 is connected, while the opposite end of this supply pipe extends to the under side of the measuring tank, and enters a valve seat 9, which is rigidly connected to the central portion of the bottom of the measuring tank, and which is formed with a circular depression or recess, in which is placed a disk 10, which I term the valve disk. The valve disk 10 is pivotally connected centrally to the valve seat in any suitable manner, by which a liquid tight joint may be maintained between the valve seat and the valve disk, but I preferably make this pivotal connection in the following manner: On the under side of the center of the valve disk I form a depending stem 11, which extends through an axial aperture in the seat, around which a hub 12 is formed, and on the stem against the under side of the hub 12 I place a cupped washer 13, which receives the end of the hub, and which is held up against it by a wedge key 14, which extends through a slot or recess 15, formed in the under side of the washer, and also through a slot 16 in the stem. The small end of the wedge is threaded, and a clamping nut is threaded to it, which is adapted to be screwed up against the side of the washer and tighten the wedge key to press the washer up against the hub and thus draw the valve disk down against its seat tight enough to prevent leakage. The cupped washer prevents the wedge key from contacting with the hub of the valve seat, and thus permits the valve to be easily turned by the operating handle. Below the washer and wedge key, the stem 11 is tapered, as shown, and one end of a handle 17, which I term the valve operating handle, is secured upon this tapered portion, by a clamping nut 18, which is threaded to the end of the stem.

A graduated quadrant bracket 19, is connected to the measuring tank support in any suitable manner, and this graduated or index quadrant is provided with notches which are spaced at equal distances apart around it, and upon the upper side of the quadrant is secured a guide plate 20, of the same curve as the quadrant, a space being left between the quadrant and plate through which the operating handle extends. The quadrant is notched at equidistant points to indicate a pint, quart, gallon, and so on, and the under side of the handle is provided with a tooth 21, which will engage these notches as the handle is turned, and indicate the exact point at which the handle should stop, for any desired quantity of liquid to be measured and drawn off. The guide plate has indicating marks at points corresponding to the notches on the quadrant above which is shown the word or sign indicating the amount of liquid the tank will discharge when the operating handle is moved to any one of the indicating marks.

The measuring tank is provided with a removable cover 22, which is preferably secured to the tank by a liquid tight joint, but at the same time can be removed therefrom whenever desired. The cover is provided with an air vent valve 23, which permits the oil to flow freely, when the valve is opened, and the reservoir is provided with a glass gage 23A to determine the height of the liquid therein. This glass gage is provided with the usual pipe water gage fittings, which connect at the top and bottom portions of the tank in a well-known manner.

The valve seat is provided with a segmental recess or chamber 24, concentrically arranged with respect to the center of the seat, and adjacent to its circumference, and a threaded hole is formed at one end of this chamber, to which is secured one end of an outlet or dispensing pipe 25. The valve disk is provided with a plurality of independent liquid discharging apertures, each of which is of a diameter corresponding to the width of the chamber 24 of the valve seat, and these apertures are arranged in a concentric row in the valve seat, so that each will register over the segmental chamber in the valve seat as the valve disk is turned or partially rotated by the manipulation of the operating handle, as will be explained more fully hereinafter.

In each of the valve disk apertures is screwed a tube 26, the tubes being of different lengths, and these several tubes determine the different quantities the tank is capable of measuring; thus, if a pint, quart, half-gallon, and gallon measures are required, the valve disk would require four tubes, which is the number shown, and the segmental chamber in the valve seat would be made long enough to drain all four of these tubes when the disk is moved to its limit or when the greatest quantity for which the tank is arranged, is required. Consequently, I have illustrated four liquid discharging tubes in the valve disk, and these tubes extending up vertically into the measuring tank, the length of each tube bearing a relative proportion to the diameter of the tank, and the tubes being arranged in the order of their measuring capacities, the longest tube giving the smallest measuring capacity, and the shortest tube giving the largest measuring capacity. Thus the pint measuring tube is the longest, and the quart is a little shorter than the pint, and the half-gallon tube is a little shorter than the quart tube, and the gallon is a little shorter than the half gallon; and as I preferably make these tubes all of the same diameter, they vary proportionately in length from the pint or longest to the gallon or shortest tube. The liquid measuring tank is of such an area that the amount of liquid in the tank above the pint tube and including the contents in the tube will amount to a pint, the liquid above the quart tube and including what is in the quart tube as well as what is in the pint tube will equal a quart, the liquid above the half-gallon tube and including all the liquid that fills it and also the entire contents of the quart and pint tubes will equal a half-gallon, and the gallon tube will receive all of the liquid above it plus all of the liquid of the half gallon, quart, and pint tubes. The tubes of the valve disk are arranged to register with the chamber 24 of the valve seat in successive order from the pint tube around to the gallon tube; thus if a half-gallon is wanted, the operator moves the valve disk operating handle to the half-gallon notch of the indicating quadrant, which brings the half-gallon tube above the outlet chamber 24, together with the quart and pint tubes, as it requires all of the liquid in them, and also all in the tank above the top of the half-gallon tube, to make a half-gallon. The valve seat 9, is provided with an inlet aperture 27, which normally registers with the last measuring tube of the series, in the order in which the tubes register with the outlet, and oil or other liquid from the reservoir passes through the supply tube 3, and the gallon tube to the measuring tank, thus keeping the said tank filled. The instant the operating handle is moved toward a desired point, the inlet is closed, and no more liquid can enter the measuring tank, until the handle is restored to its normal position, when the tank immediately fills again. The upper ends of the tubes 26, may be curved if desired, as shown at 26A Fig. 8.

My invention is simple and practical, and will actually measure such liquids as vinegar, kerosene, gasolene, cider, and other liquids, in quantities from a pint to a gallon, or a greater quantity if desired, the quantities being determined by the length and number of the tubes.

Having described my invention, what I claim as new and desire to secure by Letters Patent is:

1. A liquid measuring tank, provided with a cover a reservoir adjacent to said tank, a liquid conveying tube connecting said tank and reservoir together, an air vent in said cover, an oscillatory valve in the bottom of said tank comprising a valve seat and a valve disk, said valve disk being provided with a group of liquid discharge ports, a plurality of liquid measuring tubes of such length and arrangement as to discharge different quantities of liquid connected to the valve ports of said valve disk, an operating handle connected to said valve disk, and a measuring index arranged to define the valve opening movement of said operating handle.

2. In a liquid measuring machine, the combination of a reservoir tank, provided with a liquid indicating gage, a discharge pipe connected to said reservoir tank, a liquid measuring tank connected to said reservoir by said discharge pipe, and comprising a closed tank having a valve in its bottom adapted to control the liquid passage between said reservoir and measuring tank, said valve having a plurality of liquid discharging apertures provided with a plurality of liquid discharging tubes extending into said tank predetermined distances, said tubes being of such length and arrangement relative to the capacity of said tank above the inlet of each tube as to discharge different predetermined measures of liquid, an operating handle connected to said valve, and an index arranged to determine the operative valve opening and closing movements of said handle.

3. In a liquid measuring machine, a reservoir provided with a discharging pipe, a measuring tank connected to said discharge pipe, a valve seat in the bottom of said tank, a multiple port valve in said seat, a measuring tube connected to each port of said valve, said tubes being of such length and arrangement relative to the capacity of said measuring tank's capacity, and with each other to discharge different quantities of liquid, and an operating handle arranged to oscillate said valve disk to cut off the supply of liquid to the measuring tank, and open said measuring tank's measuring tube ports, as specified.

4. In a liquid measuring tank, the combination of the reservoir, the water gage connected thereto, and the liquid discharging tube connected to said reservoir with the measuring tank comprising a closed tank provided with a removable cover having a suitable air vent valve therein, a valve in the bottom of said tank, having a plurality of liquid discharging valve ports, a plurality of liquid measuring tubes extending vertically from said valve ports into said measuring tank, said liquid measuring tubes being arranged to measure different quantities of liquid, said valve being provided with a port arranged to control the reservoir's inlet pipe into said measuring tank, and arranged to stand open when said measuring valves are closed, and to be closed when said measuring tube ports are opened, an operating handle for operating said valve to close said reservoir's liquid discharging pipes inlet into said measuring tank and to open any predetermined measuring tube port at the same time, and an index connected to said measuring tank and arranged to indicate the movement of said valve operating handle to open any predetermined measuring tube's liquid discharge port.

5. In a liquid measuring device, the combination with a reservoir provided with a liquid discharge pipe, of a measuring tank connected to said reservoir's discharge pipe, provided with a liquid discharge aperture, a rotary valve disk in the bottom of said tank having apertures provided with liquid discharge tubes of varying lengths, which register in successive order with the outlet in said tank as said disk is rotated; a handle for rotating said disk, and a quadrant over which the handle travels, having indicating marks, which designate the position of any one of the liquid discharge tubes, relatively to the outlet, when the handle is operated.

6. In a liquid measuring device, the combination with a reservoir provided with a discharge pipe, of a measuring tank provided with an inlet aperture connected to said reservoir's discharge pipe; a valve seat in the bottom of said tank registering with said measuring tank's inlet aperture, having an outlet; a rotary disk valve in said seat having apertures which register with said outlet in successive order as the valve is rotated; tubes of successively varying lengths, in said apertures, the shortest of which registers with the tank inlet; a handle for rotating said disk, and an indicating device in the path of the handle, by which the position of the handle will indicate the position of any one of the discharge tubes relatively to the outlet.

7. The combination with a suitable support of a reservoir thereon; a measuring tank below said reservoir provided with an inlet in its bottom and a pipe connecting said measuring tank's inlet with said reservoir; a valve seat in the bottom of said tank, having a segmental chamber with an outlet; a valve disk in said seat, having a plurality of apertures which register successively with said chamber as the disk is rotated; tubes of successively varying lengths in said apertures, the shortest of which registers with the inlet of the tank, and means for rotating said valve disk.

8. In a liquid measuring device, the combination with a suitable support, of a reservoir supported thereon; a measuring tank below said reservoir provided with an inlet in its bottom, and a pipe connecting said reservoir with said inlet in the bottom of said tank; a valve seat in the bottom of said tank, having a segmental chamber provided with an outlet; a valve disk having a plurality of apertures, which register successively with said chamber as the disk is rotated; tubes in said apertures of successively varying lengths, the shortest of which registers with the tank inlet; an axial stem on said disk extending through said seat, and means for holding said disk securely but movably upon its seat; a handle on the end of said stem, and a segmental plate over which said handle is moved, having indicating marks whereby when said handle is brought to register with any one of said marks, the position of one of the tubes, relatively to the outlet, is indicated.

9. In a liquid measuring device, the combination with a tank, of a valve seat in the bottom of said tank, comprising a circular plate having a circumferential rim, and a segmental slot provided with an outlet; a valve disk within the rim of said seat, having apertures which register successively with the slot as the valve disk is rotated; tubes of successively varying lengths in said apertures a hub on said valve stem; an axial stem provided with a tapered end on said disk which extends through the hub of said valve seat a slot in said stem; a cupped washer on said stem, bearing against said hub; a wedge key which passes through the slot in said stem and washer, whereby said valve disk is held upon its seat; a handle secured upon the tapered end of said stem, and means for determining the point to which the handle must be moved for measuring and discharging a given quantity of liquid.

In testimony whereof I affix my signature in presence of two witnesses.

PAUL C. CLARKE.

Witnesses:
G. SARGENT ELLIOTT,
ADELLA M. FOWLE.